/ 
US007116353B2

(12) United States Patent
Hobson et al.

(10) Patent No.: US 7,116,353 B2
(45) Date of Patent: *Oct. 3, 2006

(54) DIGITAL VIDEO RECORDING SYSTEM

(75) Inventors: Gregory L. Hobson, St. Charles County, MO (US); Jerry Moore, St. Louis County, MO (US); John R. Wootton, St. Louis County, MO (US); James C. Myers, St. Louis County, MO (US); Jeffrey J. Orth, St. Louis County, MO (US)

(73) Assignee: ESCO Corporation, St. Louis, MO (US)

( * ) Notice: Subject to any disclaimer, the term of this patent is extended or adjusted under 35 U.S.C. 154(b) by 774 days.

This patent is subject to a terminal disclaimer.

(21) Appl. No.: 09/808,326

(22) Filed: Mar. 14, 2001

(65) Prior Publication Data

US 2001/0052131 A1    Dec. 13, 2001

Related U.S. Application Data

(63) Continuation-in-part of application No. 09/356,129, filed on Jul. 17, 1999, now Pat. No. 6,317,152.

(51) Int. Cl.
H04N 7/12 (2006.01)
H04B 1/66 (2006.01)

(52) U.S. Cl. ..................................... 348/150
(58) Field of Classification Search ............... 348/150, 348/155, 143, 151, 152, 153, 154, 156, 159, 348/699, 700; 375/240.01, 240.16; 386/109, 386/112, 124, 125; 382/192, 283, 282; 356/124.5; 358/538, 539; H04N 7/18, 9/47
See application file for complete search history.

(56) References Cited

U.S. PATENT DOCUMENTS 3,816,648 A * 6/1974 Noll et al. .................. 348/154

5,091,780 A * 2/1992 Pomerleau ................... 348/152
5,229,850 A    7/1993 Toyoshima
5,371,551 A   12/1994 Logan et al.
5,731,832 A    3/1998 Ng
5,751,346 A * 5/1998 Dozier et al. ............... 348/153
5,937,092 A * 8/1999 Wootton et al. ............ 382/192
5,956,424 A    9/1999 Wootton et al.
5,986,695 A * 11/1999 Choi .......................... 348/155
5,996,023 A   11/1999 Winter et al.
5,999,662 A * 12/1999 Burt et al. ................... 382/284

(Continued)

Primary Examiner—Nhon Diep
(74) Attorney, Agent, or Firm—Polster, Lieder, Woodruff & Lucchesi LC

(57) ABSTRACT

A digital video recording system (10) includes a video camera (12) directed at a scene of interest to continuously view the scene and generate video images (F) of the scene. An image processor (14) is configured to compare the video image (F) with a previously established reference image (Fr) of the scene to determine if changes have occurred. The image processor includes a memory (20) in which portions of video images (F) are stored, together with the time and date information as to when the image was acquired. A video playback capability (30) allows the memory to be accessed to retrieve the portions of the video images for image reconstruction. The playback system enables the memory to be accessed at any desired date and time location so an image of interest can be reconstructed without having to scan stored video images in a date/time sequence. Accessing the memory is done without interrupting the image processor's processing of currently acquired video images.

29 Claims, 4 Drawing Sheets

U.S. PATENT DOCUMENTS

| | | |
|---|---|---|
| 6,069,655 A | 5/2000 | Seeley et al. |
| 6,069,691 A | 5/2000 | Rosow et al. |
| 6,101,276 A | 8/2000 | Adiletta et al. |
| 6,125,145 A | 9/2000 | Koyanagi et al. |
| 6,130,707 A * | 10/2000 | Koller et al. ............... 348/155 |
| 6,414,994 B1 * | 7/2002 | Hazra .................... 375/240.16 |
| 6,727,938 B1 * | 4/2004 | Randall ...................... 348/143 |

\* cited by examiner

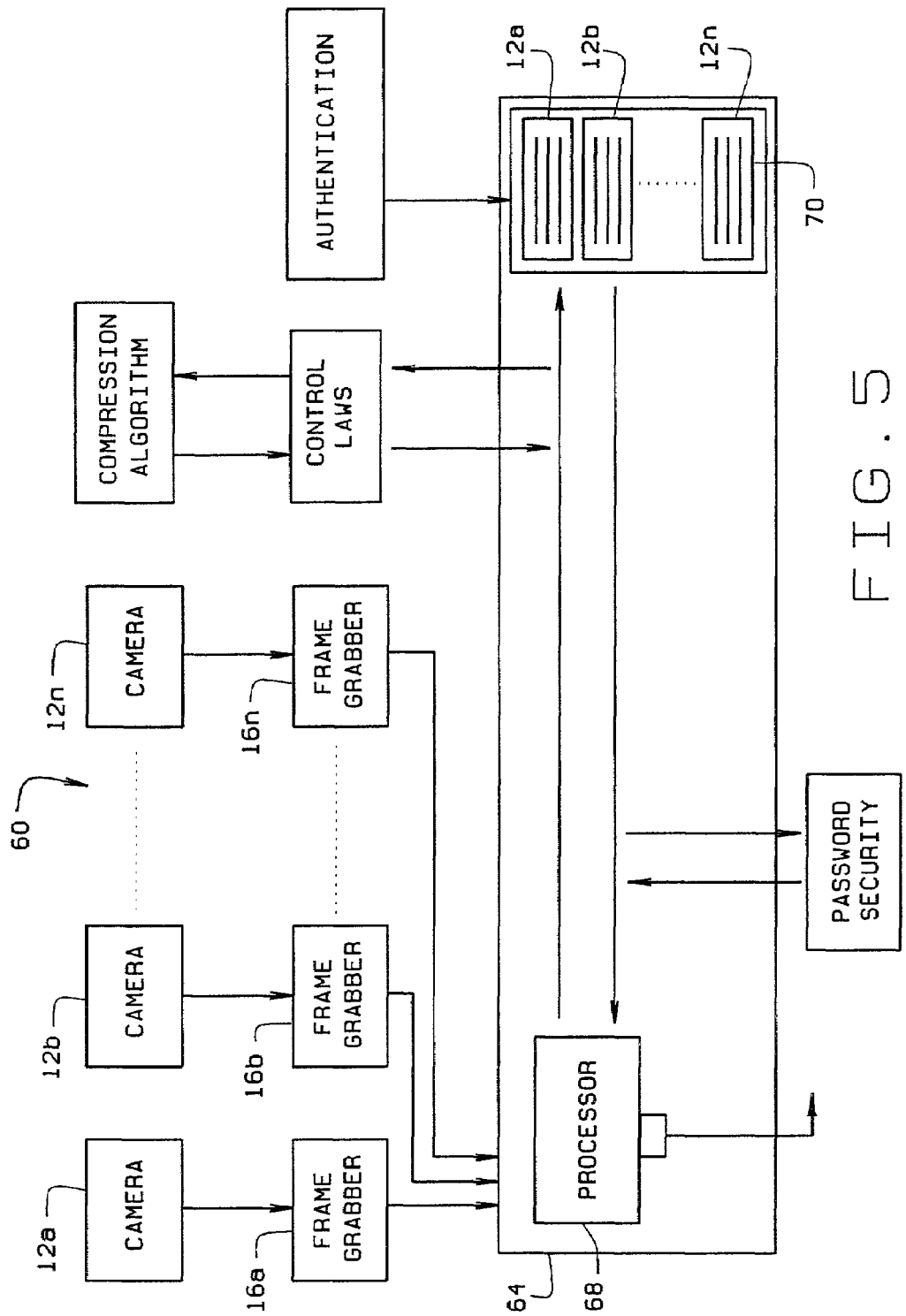

DIGITAL VIDEO RECORDING SYSTEM

CROSS-REFERENCE TO RELATED APPLICATIONS

This application is a continuation-in-part application, based upon U.S. patent application Ser. No. 09/356,129, filed on Jul. 17, 1999, now U.S. Pat. No. 6,317,152 from which priority is claimed.

STATEMENT REGARDING FEDERALLY SPONSORED RESEARCH OR DEVELOPMENT

Not applicable.

BACKGROUND OF THE INVENTION

This invention relates to video recording, and more particularly, to a digital video recording system for use at Point of Sale (POS) locations, Automated Teller Machines (ATM's), and other locations where the monitoring of activities is important.

Video recording equipment is in common use throughout industry and commerce. Conventional video recording systems are analog systems employing a video recorder which records images on a magnetic tape. The recorder used is a slow scan recorder whose video input is provided by a camera located at the POS or ATM. Recording is typically continuous over a predetermined period which is typically 24 hours. If nothing of significance occurs during the recording period, the tape is simply rerun again through the recorder with the prior recorded images being recorded over.

This process has a number of problems associated with it. In most installations, most of the time, nothing ever happens. Rather, the same tape is used over and over with the same background image being recorded over and over. Only if something of significance happens is the tape removed and replaced. Preferably, each tape should be removed, degaussed, and reinserted in the recorder at the end of each recording interval. Or, each tape is changed every day with the tape removed being degaussed before its next use. However, this is seldom done because of the expense or impracticality of doing so.

Because the same images are continuously being recorded, over time, the magnetic particles in the tape tend to align themselves in a particular orientation consistent with those images. This residual magnetization degrades the resolution capability of the tape and resulting quality of the recorded images. One problem law enforcement officers or security personnel have with the recording systems described above is that the poor quality of the recorded images makes it difficult to discern features or details of the events captured on the tape, including the identification of persons.

Another problem with conventional recording systems is that simply because an event of significance has occurred, recording does not stop. Thus, in order to view the event, it is necessary to rewind the tape and scan through it to the place where the event is recorded. In situations where time may be critical, the resulting delay is very undesirable.

U.S. Pat. No. 5,996,023 to Winter et al. teaches the use of circular pre-alarm buffering at high frame rates. The circular pre-alarm buffer is used to delay a signal until a set time has passed and a decision can be made as to the occurrence of an activity of interest. The circular pre-alarm buffer is continuously overwritten unless an alarm input triggers the contents to be marked for permanent storage. In this manner, high frame rate recordings (15 fps or more) can be made during the time of interest. The '023 Winter et al. patent specifically rejects the use of continuous recording at low frame rates (e.g. 1 fps) as outlined as possibly missing important data. The teachings of the '023 Winter et al. patent also discuss the detection of motion. However, there is no indication of how the motion detection is performed and specifically, the motion is not used to aid in the size reduction of the stored data. It is used to provide event related information for storage with the image.

U.S. Pat. No. 5,371,551 to Logan et. al teaches the use of a buffer to provide a time delay in viewing stored images with pause, reverse, and thumbnail functions. The '551 Logan et al. patent also teaches that read-out rates may be different than input rates to accommodate a limited storage capacity. The '551 Logan et al. system cannot be readily adapted to systems with a large or unlimited storage capacity configured for continuous activity recording.

U.S. Pat. No. 6,101,276 to Adiletta teaches the detection of motion through comparison with a reference image, using macro blocks to determine two types of macro block coding, spatial and temporal. Spatial blocks are coded by encoding the raw block itself. Temporal blocks are coded by finding motion vectors relative to a reference block and then encoding the error between the reference block and the temporal block. The blocks are encoded by comparing them to reference images and assigning a code to each block. The complexity of the identification of motion vectors is processor intensive, and the use of these operations requires specialized hardware, with some of the processing being done in software.

U.S. Pat. No. 6,125,145 to Koyanagi also teaches the use of motion detection using a complex algorithm for brightness and color information. The '145 Koyanagi patent further teaches the use of motion range detection at various distances from the camera using a plurality of ranges. The '145 Koyanagi patent uses of one of three operator selected methods for updating the reference image, unconditional, conditional, or none. Reliance upon an operator selected method for updating a reference image introduces a source of error into the system, as the environmental conditions in an image field may change such that the update method originally selected by the operator is no longer the best method.

U.S. Pat. No. 5,731,832 to Ng teaches the generation of a difference matrix of average differences between reference-frame macro blocks and current-frame macro blocks to detect motion. This may be used for intrusion detection. As an ancillary function, the current image is recorded if the difference matrix profile exceeds a threshold. Of note is that the entire image is recorded rather than only the difference portions as in the present invention. Also, only the image containing the detected motion is recorded and there is no continuous recording of image data, which may cause the loss of important context information contained in either previous of subsequent image frames.

Finally, U.S. Pat. No. 5,229,850 to Toyoshima teaches the use of an external sensor to detect the occurrence of an event to be monitored and to trigger the recording of an image associated with the event, adding to the complexity of the system.

BRIEF SUMMARY OF THE INVENTION

Among the several objects of the present invention may be a digital video recording (DVR) system and apparatus for use in recording transactions and other occurrences sufficiently important that it is desirable to record them. The DVR system replaces conventional analog tape recording systems now in use with a personal computer (PC) configured to process and store digital images.

A further object of the invention is to provide a system which captures and stores high resolution images, and maintains the quality of the stored image regardless of the amount of time elapsed from when the image was recorded, the number times which the image is viewed, and how often the media on which the image is stored is overwritten.

A further object of the invention allows prior recorded images to be played back repeatedly; even while the system is recording current images from a camera, and in which the playback speed of a recorded image can differ from the speed at which image were recorded.

A further object of the invention is a system in which recorded images are date and time stamped for random access search and recall rather than by a linear rewind/fast forward search and recall such as is done with conventional recording systems. Viewing of a stored image is done either locally or at a remote location. If done remotely, the image is transmissible over standard telephone lines without a degradation in image quality.

A further object of the present invention is a DVR system in which recorded images are compressed so to greatly increase the storage capability of the system. Image compression ratios are not constant, but rather are determined by various system factors. A compression algorithm is selected for compressing the image as a function of image content, location of the image within a scene being recorded, and the quality, resolution, and threshold of the compressed image, etc.

A further object of the present invention is a DVR system in which images are authenticated for future usage as evidence of a crime, for example. Authentication prevents tampering with the recorded material.

A further object of the present invention is a DVR system which is readily expandable such that the processor can receive inputs from multiple cameras without degrading the image processing capacity. The storage capacity of the DVR system may be readily expanded, enabling the system to provide continuous coverage for multiple cites with a separate camera being located at each site, but with image processing being accomplished at a remote location so monitoring at any particular site is not compromised.

A further object of the present invention is a DVR system which purposefully records images at a lower frame rate to allow for continuous recording without regard to any particular activity. In this manner, all motion of interest in a camera field-of-view may be examined at a later time rather than just during a limited time interval.

A further object of the present invention is a DVR system is the use of detected changes in the scene to record only those portions of an image which have changed relative to a reference image, thereby reducing the storage of redundant or unimportant data. The added compression of the current invention due to the storing only of changed image areas precludes the need for buffering. Any area of the recorded data can be read out simultaneously with writing new data. For example, images which are 30 days old may be read out just as easily as those that are a few seconds old. This type of access cannot be performed using buffering techniques. The current invention does not require the use of buffers or time delays since all activity is recorded in a continuous manner.

A further object of the present invention is a DVR system is the simplification of the recording process to preclude the use of hardware specific encoders. Specifically, motion vectors are not sought since determination of these vectors is very processor intensive and requires specialized hardware to allow real time performance. This situation is aggravated when attempting to record data from multiple camera inputs.

A further object of the present invention is a DVR system in which motion is specifically excluded as an aid in the encoder. The current invention relies on the simpler concept of change in an image area, wherein any change in a specified area results in the storing of that area for the current image. Any area or region in an image which is not changed from a reference image is not stored. This simplification dramatically reduces processor requirements and the amount of data which must be stored. No motion vector searches must be performed and no image data is stored unless changed from a reference. No distinction between spatial and temporal blocks is required and no coding of blocks is performed. Rather, each block with changes detected is simply encoded using a standard image compression algorithm such as JPEG.

A further object of the present invention is a DVR system in which only intensity information is used in the identification of changed image areas, allowing for fast identification of the image areas to be compressed and stored. This allows for continuous recording of images at low data rates which results in many days of storage being available.

A further object of the present invention is a DVR system maintains a simple algorithmic approach to determine when to update the reference image. The update method of the current invention automatically accounts for memory requirements, time between references, and image change considerations when making a determination if a new reference is needed. There is no reliance on an operator selection of update method to account for changed image environments.

A further object of the present invention is a DVR system which does not rely on the computation of average values of macro blocks but rather on the comparison of individual pixels within macro blocks to detect when an image change occurs between a reference macro block and a current image macro block. Detection or identification of motion is of no significance, nor is the identification of motion when considering the scene as a whole. Specifically, the DVR system of the present invention does not exclude light changes or other variations which may result in a similar average value between a current macro block and a reference macro block. The various objects of the invention simplify the change detection and allow for the compression and storage of only the changed macro blocks.

A further object of the present invention is a DVR system which uses only image information, time, and amount of data stored to determine when to take a new reference image.

A further object of the present invention is a DVR system in which no external sensors are utilized to determine when to capture a new reference image.

In accordance with the present invention, generally stated, a digital video recording system is for use at ATM machines, POS locations and the like. A video camera is directed at a scene of interest. The camera continuously views the scene and generates video images of the scene. An image processor evaluates digital signals representative of the video images, and in doing so compares the video image represented by a digital signal with a previously established reference image of the scene to determine if any changes have occurred therein. The image processor includes a memory in which a compressed video image is stored together with time and date information as to when the image was acquired. A video playback capability allows the memory location where an image of interest is stored to be directly accessed to retrieve the image. The playback system enables the memory associated with any desired date and time location to be directly accessed so an image of interest can be reviewed without having to sequentially scan video images in a date/time sequence. Further, accessing the memory is done without interrupting the image processor's ongoing evaluation of video images. The system may be adapted for use with multiple cameras. Other objects and features will be in part apparent and in part pointed out hereinafter.

BRIEF DESCRIPTION OF THE SEVERAL VIEWS OF THE DRAWINGS

In the drawings,

FIG. 5 is a block diagram of a second embodiment of the system; and,

Corresponding reference characters indicate corresponding parts throughout the drawings.

DETAILED DESCRIPTION OF THE INVENTION

Figure 1:
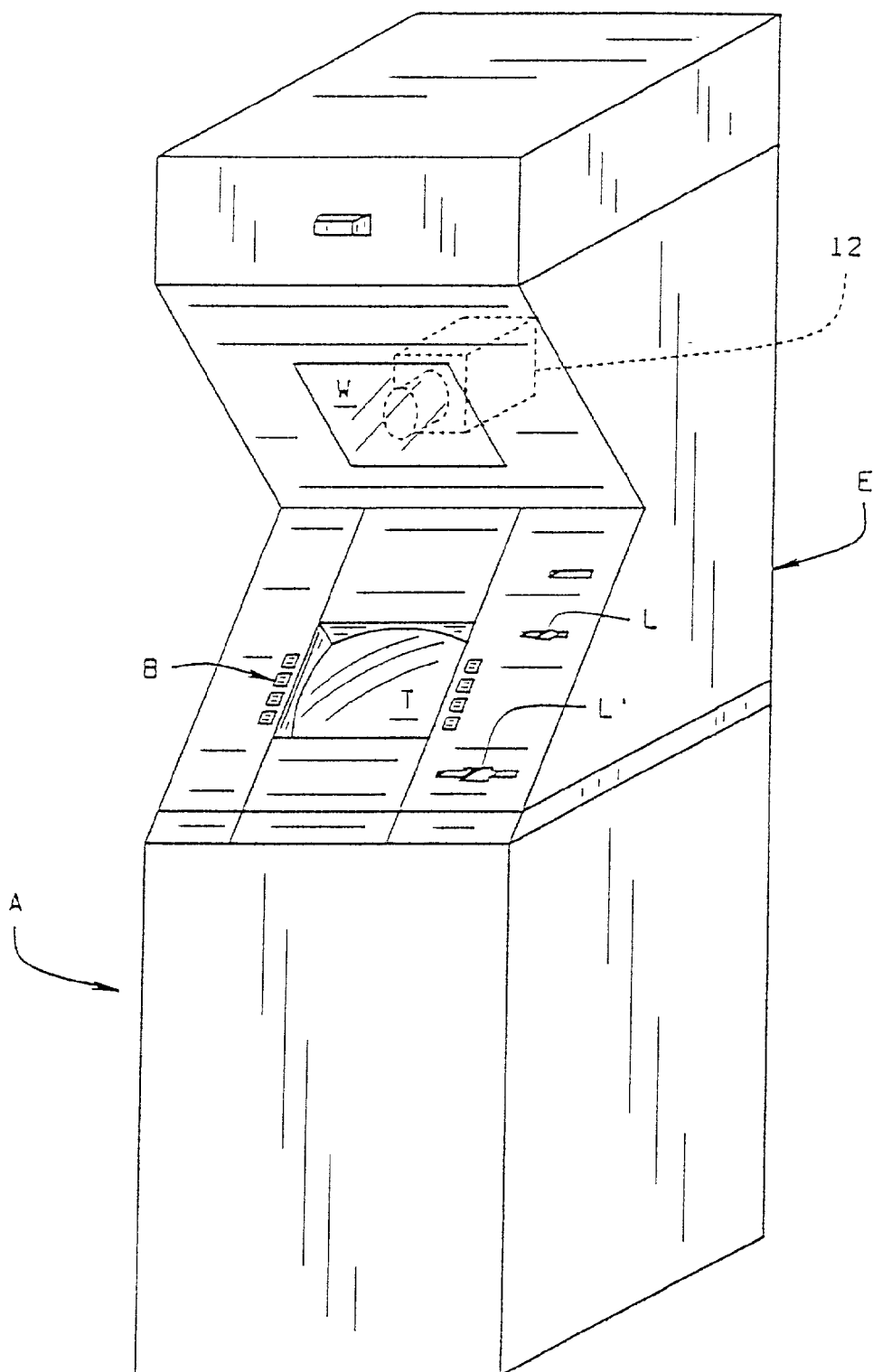
FIG. 1 is a representation of an installation with which the DVR system of the present invention is used.
Figure 2:
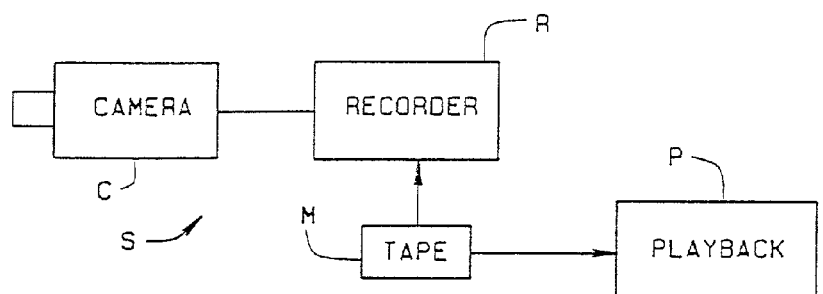
FIG. 2 is a simplified block diagram of a prior art recording system.

Referring to the drawings, a conventional monitoring system S utilizes a camera C which views a scene of interest. In security systems, this could be the interior of a bank, an Automatic Teller Machine (ATM), the counter of a fast food store, etc. Video images produced by the camera are transmitted to recorder R which can be on the premises or remotely located. The images are recorded on a magnetic tape M or the like. When the tape is full, it is rewound and recorded over; or it is stored away and replaced with a new tape. If something of consequence occurs, in order to view it, the tape is transferred to a playback unit P where it is rewound to the beginning. The tape is then scanned to the point where recordation of the occurrence commences for viewing by interested parties. As noted, if the tape is simply recorded on over and over, the recorded image is degraded and vital information may be lost or rendered incomprehensible.

Figure 4:
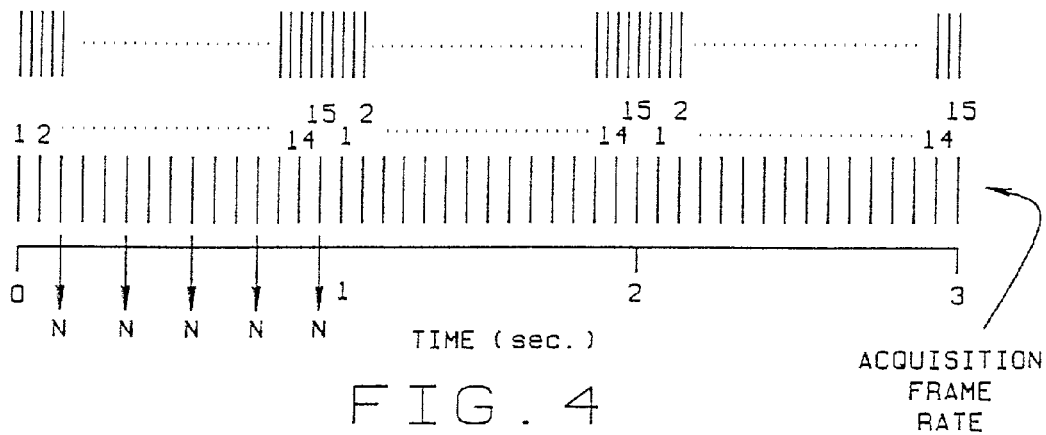
FIG. 4 illustrates the frame rate at which video images are acquired and processed and at which they are retrieved and played back.
Figure 3:
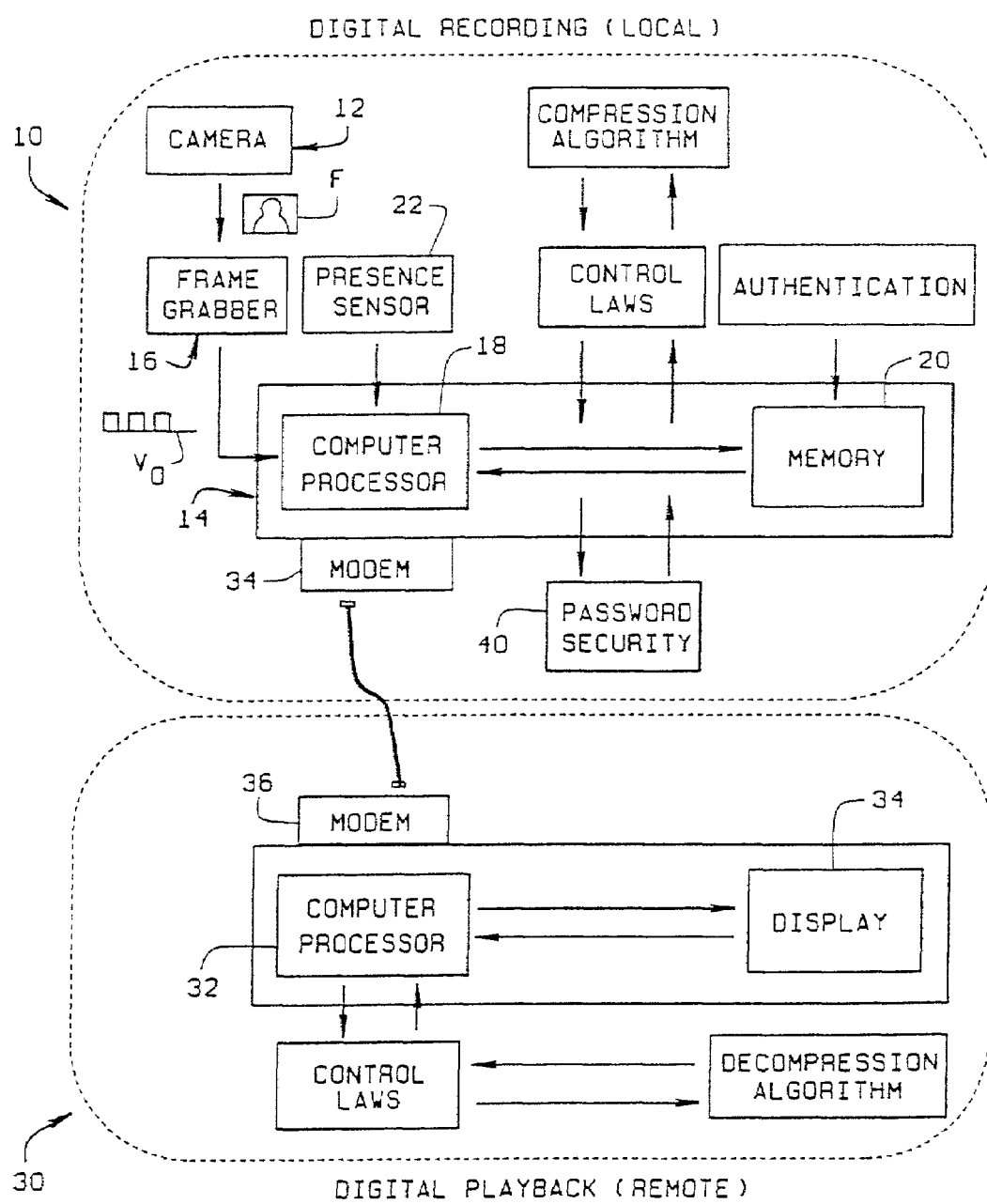
FIG. 3 is a block diagram of a first embodiment of the DVR system of the present invention.

As shown in FIG. 3, a digital video recording system of the present invention is indicated generally 10. The system first includes a camera 12 which can be a conventional video camera. An example of the use of camera 12 is shown in FIG. 1. An ATM machine A comprises an enclosure E. A monitor T, slot L for insertion of a customers ATM card, and pushbuttons B allow the customer to enter transactional information into a cash dispensing system enclosed in the machine. Once a transaction is authorized, cash is dispensed to the customer through a second slot L'. Camera 12 is mounted in the machine above the monitor at a level that allows the camera to obtain a face-on view of the customer. A one-way mirror W is placed in front of the camera. Camera 12 generates video images F at a variable frame rate which is, as shown in FIG. 4 for example, 15 frames/sec. The video image produced by the camera comprises an analog signal which is provided as an output from the camera. It will be understood by those skilled in the art that while camera 12 typically operates in the visible range of the light spectrum, it does not have to. Camera 12 could, for example, be an infrared camera.

The analog signal produced by camera 12 is transmitted from the ATM machine to an image processor 14 which is remotely located with respect to the machine. A frame grabber 16 is interposed between the camera and image processor. This unit performs two functions. First, as its name suggests, it selects (grabs) frames of video from the stream of video transmitted by the camera. As shown in FIG. 4, frame grabber 16 is programmed to select every $N^{th}$ frame of video from the camera. In FIG. 4, N=3; however, N can be any convenient number. In addition, the frame grabber converts the video signal from an analog signal to a digital signal VD capable of being processed by image processor 14.

It will be evident to those skilled in the art that portions of the frame grabber 16 may be modified if the camera 12 directly provides digital output. In that case, the frame grabber may merely be used to capture the desired frames from the incoming stream of digital data. The function of converting the video signal from an analog signal to a digital signal will be unnecessary as the digital video signal $V_D$ is provided directly.

In a preferred embodiment, image processor 14 comprises two main elements: a microprocessor 18, and a memory 20. The image processor 14 is effected, for example, using a personal computer (PC) as a platform, and 20 gigabytes of disk memory. Use of a PC enables image processing to be accomplished using any appropriately equipped and programmed computer, whether a desktop, laptop, or other. This greatly enhances the flexibility of the system. The large capacity of memory 20 enables between 50 and 100 days of video imagery to be stored from a single camera 12. Further, unlike conventional video tapes which have a recording (storage) capacity of a but few hours at most, and which is non-expandable, memory 20 is readily expandable.

Figure 6A:
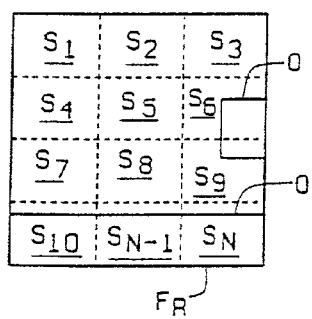
FIGS. 6A and 6B represent a reference image obtained by the camera (FIG. 6A), and an image (FIG. 6B) processed by the system to determine if there are any differences with respect to the reference.
Figure 6B:
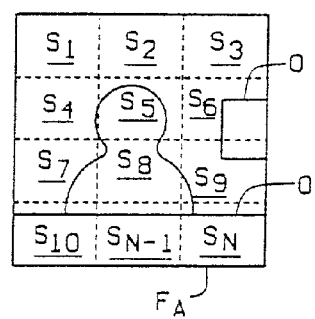

As represented by FIG. 6A, an image obtained by camera 12 is established as a reference against which the contents of subsequently acquired images are compared by the microprocessor 18. The image represented by FIG. 6A has, for example, a resolution of 480 pixels by 640 pixels. Microprocessor 18 is configured to divide this image into, for example, 32 pixel by 32 pixel segments S for processing. As shown in FIG. 6A, the image is divided into n segments S1, S2, . . . Sn-1, Sn. The contents of each image segment may include all or part of objects O which objects are fixed in the scene. In processing the digital image, microprocessor 18 is configured to first compare segment S1 of the reference frame $F_R$ with segment S1 of the frame $F_A$ being analyzed. If the two frame segments compare with each other, the microprocessor 18 repeats the analysis with the next two corresponding frame segment. In the simplified representations of FIGS. 6A and 6B, the microprocessor 18 will note the differences in segments S5, and in S7–S9 of the frame $F_A$ being compared with the reference frame $F_R$. The processor discards the remaining frame segments in which there were no differences between the two frames, and stores the frame segments where differences appear in the memory 20.

If they do differ, frame segment S1 is marked for later storage. A preferred approach for comparing segments S is to perform a pixel by pixel comparison such that, if any corresponding pixels have an absolute difference in intensity which exceeds a threshold, a count is incremented. If the count of such pixels exceeds a second threshold, the segment is marked as changed. After all the segments S1 through Sn are so examined, the marked frame segments where differences appear are stored in memory 20.

It will be apparent that other methods for determining the difference between two frame segments may be utilized without fundamentally altering the process of detecting and storing only those frame segments which have differences. For example, in images from non-visual detectors, a pseudo color representation of the scene may be made such that changes in color are appropriate to use to detect segment differences. Other algorithms may be employed which do not modify the basic object of the invention which is to detect changed macro blocks and only store those changed macro blocks and the corresponding reference images in memory 20 in order to increase the data storage compression efficiency.

Image processor 14 periodically updates the reference image against which newly acquired frames $F_A$ are compared. Because the system is typically used for security monitoring purposes, it is inefficient for the system to react to every change which may occur in the scene observed by the camera. For example, if the camera in the ATM machine of FIG. 1 observes vehicles or passersby in the vicinity of the machine, it is not necessarily important that their passage be noted. These background changes are not important. What is important are changes in the area immediate the machine.

It is evident from the previous description that the amount of data recorded will be greatly reduced if the reference image $F_R$ contains only background data such that if an image $F_A$ contains the same objects O, nothing will be stored. It is also necessary to account for system memory requirements and time elapsed since the last reference image when deciding when to update the reference image. Thus, a preferred algorithm for determining when to update the reference image Fr is as follows.

Let N be the number of segments S in any image be N. Further, let M be the number of segments S saved from all Fa since the last reference frame. Then do the following:

If (time since last reference frame >15 minutes) or (M>40 times N) then
   take a new reference frame, Fr
else if (time since last reference frame >10 minutes) or (M>20 times N) then
   if the current frame Fa has not changed compared to the previous frame
   Fa by more than 5 segments then
   take a new reference frame, Fr
   end if
end if.

Thus, a new reference frame is taken a minimum of every 15 minutes or when the storage exceeds 40 times N. A new reference is also taken if the last two frames Fa are nearly identical and the time since the last reference frame Fr is at least 10 minutes or the storage is at least 20 times N. Typically, a new reference will be taken whenever there is little change between two images. This corresponds to the condition that only background objects O are in the reference image. The specific times selected and the amount of storage selected are dependent on the characteristics of processor 14 and so will change depending on the specific implementation.

The periodic updating of the reference image in the manner described will minimize the amount of storage required for long periods of inactivity in the scene which camera 12 is monitoring. Only when a change in image is detected will the corresponding segments S be recorded. However, in some situations, the camera view may include areas which are not of primary interest such as background traffic in a store in which the enclosure E is situated. In some installations it will be desired by the users of the system to record this activity and in other situations the users of the system will be more interested in maximizing the storage and not recording the extra information. The background traffic may be of interest if the user wishes to determine what activity occurred immediately before an incident. For example, if the enclosure E is vandalized it would be advantageous to maintain the recording of activity preceding the time period of the damage. In other situations, there may be auxiliary cameras which can adequately provide these details such that the only desired recording for camera 12 is that of people which approach the enclosure E. Accordingly, the system may optionally incorporate a presence sensor 22 which signals the processor when, for example, someone approaches the machine. This signal may be used by the processor to only record segments S when the sensor indicates someone in close proximity to the monitor T.

Optionally, the system 10 may incorporate a presence sensor 22 which signals the processor when, for example, someone approaches the machine. At that time, the image processor 14 responds by refreshing the reference image $F_R$, and comparing subsequence image frames with the refreshed image $F_R$.

In storing the digital video images in memory 20, image processor 14 performs a number of functions. To conserve space in memory 20, the video image is exercised using a compression algorithm which minimizes the amount of information required to be stored, while at the same time insuring that none of the information contained in the image is lost so a high resolution image is always available for viewing. The compression algorithm is used in conjunction with certain control rules which establish the format for storing information in memory 20, and retrieving it from the memory. For different applications, different compression algorithms are used and the particular algorithm for the attendant application is established by the control laws portion of the processor.

Further, all stored video images are date and time stamped with the time of day and the date on which the image was recorded. This information is encoded as digital data appended to the other digital data representing the image which is stored in the memory with the image contents. In addition the images can also be stamped with a transaction identification (ID) obtained from an associated device. For example, a transaction ID produced when a user performs a specific action such as inserting an ATM card in slot L may be produced. A search of the recorded video can then be directed to the location where the ID is stored.

Optionally, an authentication algorithm is also exercised on the data stored in the memory. Authentication of video images is described in U.S. Pat. No. 5,870,471, herein incorporated by reference, which is assigned to the same assignee as the present application. Authentication is important for evidentiary purposes in that it prevents someone from tampering with the contents of an image without the tampering being readily detected. The authentication algorithm not only provides an immediate indication of tampering, but also provides information as to which part of the image has been tampered with. It will be understood that not every stored image need be authenticated.

After a video image has been processed and its contents stored, the image remains in memory 20 until it is recalled for playback. Since the memory has a large capacity, the image is stored for a substantial period of time; for example, 50–100 days. When memory 20 is full, image processor 14 will begin to overwrite the images previously stored, beginning with that image which was first stored. This "first-in, first-out" procedure insures that the more recent images are retained while those which are probably unimportant (since they have not been recalled for viewing during the 50–100 day interval) are deleted. It will be noted that this is in sharp contrast to current video recording systems in which tapes are constantly being reused so that if the importance of a recorded image is not immediately recognized, it has a good chance of being permanently lost.

System 10 further includes a digital playback capability which is indicated generally 30 in FIG. 3. The playback portion of the system includes a processor 32 which again is based on a PC platform. Importantly, the playback portion of the DVR system can be remote from the image processing portion of the system. Accordingly, a modem 34, 36 is located with the respective processors for transmitting commands and data back and forth between them. Transmission is via a standard telecommunications line and image date is transferred at a rate of 56.6 kbps, for example. Processor 32 accesses disk memory 20 through the image processor 14 via the modem link. Digital images are then transmitted from the memory via the modem link to processor 32. This processor has an associated display 34 (a television monitor or computer screen, for example) on which the images are viewed. Since the stored images are compressed images, the images received by processor 32 are first decompressed before being viewed. For this purpose, the digital images are first operated on by a decompression algorithm. As shown in FIG. 3, the decompression algorithm is also subject to certain control laws which determine which algorithm of a plurality of algorithms are used. After being decompressed by the appropriate algorithm, the reconstituted image is displayed, the image being the high resolution image presenting substantial detail to the viewer.

The above described invention has several important features over conventional recording systems. First, microprocessor 18 and memory 20 can be remote from the location at which the camera is installed. In addition, the processor 32 and display 34 can be remote from microprocessor 18 and memory 20. Second, the rate at which stored frames of video are acquired from the memory and displayed can be a substantially different than those at which the video images are processed. Third, the playback feature of the system is used simultaneously with the image processing and storage feature. Fourth, stored images are time and date stamped so the processor in the playback portion can go directly to the location in the memory where images are stored to retrieve them so there is no need to sequentially scan the memory. Fifth, stored images retrieved from memory 20 can be downloaded to other media with the superior visual qualities of the digital images being maintained.

Because the images are recorded in a digital format, off-loading or downloading images from memory 20 to another memory, regardless of the media in which that is done (diskette, tape, etc.), is accomplished without the loss of quality of the image. Generating multiple copies of the recorded image can also be done without affecting the quality of the image. Not only can the downloading be done to different media, but the rate at which this is done is variable from medium to another, and this can also be done while the system continues to process new images and store them in the memory.

Finally, system 10 includes a security system 40 preventing unauthorized persons from accessing the system. System 40 includes, for example, a password security feature which prevents one access to the system unless they possess the appropriate password. As is well-known in the art, such a system requires the user to, for example, type their password into a comparator which matches the entry against authorized passwords and allows the user access only if there is a match.

Referring now to FIG. 5, an alternate embodiment of the system is indicated generally 60. System 60 includes a plurality of cameras 12a–12n, each observing different scenes or different aspects of the same scene. Each camera 12a–12n has an associated frame grabber 16a–16n for converting incoming video signals $V_A$–$V_N$ to digital signals $V_{DA}$–$V_{DN}$. It will be appreciated that different camera/frame grabber pairs may operate at different frame rates and that an image processor 64 of the system accommodates all the frame rates for processing purposes.

It will be evident to those skilled in the art that portions of the frame grabbers 16a–16n may be modified if the cameras 12a–12n directly provide digital output. In that case, the frame grabbers may merely be used to capture the desired frames from the incoming stream of digital data, or may be eliminated completely. The function of converting the video signal from an analog signal to a digital signal will be unnecessary as the digital video signals $V_{DA}$–$V_{DN}$ are provided directly.

Image processor 64 includes a PC based microprocessor 68 and an associated memory 70. The microprocessor 68 processes the digital signals $V_{DA}$ through $V_{DN}$ and compares the video image represented thereby with a reference frame $V_{RA}$ through $V_{RN}$ for the corresponding scene being observed.

After processing, each digital signal is stored in memory 70 after first being compressed using an appropriate compression algorithm. It will be understood that different compression algorithm may be used for all the images stored in the memory; or that a different compression algorithm may be used for each image from a different observed scene.

In memory 70, the images from the cameras are assigned their own memory space. Thus, as shown in FIG. 5, all images from camera 12a are stored contiguously in one section of memory, all images from camera 12b are stored contiguously in another section of memory, and so forth with each cameras images having its own storage area. In this way, the cameras can have different frame capture rates and can have different amounts of storage allocated to the camera. This allows for different amounts of storage for each camera. For example, in the case of a two camera system with cameras 12a and 12b, 60% of the storage could be allocated to camera 12a and 40% of the storage could be allocated to camera 12b. Assuming the cameras are viewing similar scenes, assigning the same frame capture rate and compression technique to both cameras will result in the ability to store 50% more data for camera 12a than for camera 12b. Alternatively, if the frame capture rate for camera 12a is made 1.5 times as great as that for camera 12b then the allocated storage area will accommodate the same number of days of storage for both cameras.

The separate storage of images from each camera also facilitates the retrieval of image data by playback system 30.

An operator may request the data from an individual camera and it is readily available from its assigned storage area.

Those of ordinary skill in the art will recognize that alternative storage methods for multiple video images are possible. For example, in the memory 70, the images from the cameras may be interleaved. In interleaved storage, an image from camera 12a is stored in the memory, then an image from camera 12b, and so forth until an image from camera 12n. The storage cycle is then repeated. Again, it will be understood that this order is exemplary only and that the order in which the images are stored is a function of the actual sequence in which the images are processed. If a particular camera produces images at a frame rate significantly greater than that of another camera, images from the one camera will be stored more frequently than those from the other. Or, if one camera is shut down while others remain operating, only the frames from the operating camera are interleaved.

Another feature of the recording system 60 is the ability to manipulate the input images to form a multiplex of several images for storage. In this manner, if it is desired to see what happens in several views simultaneously, only a single image need to be stored, retrieved, and viewed. For example, the images $V_{DA}$, $V_{DB}$, $V_{DC}$, and $V_{DD}$ produced from cameras 12a, 12b, 12c, and 12d may all be reduced to one quarter their normal size. These one quarter size images may then be combined into a single full size image by placing $V_{DA}$ in the upper left corner, $V_{DB}$ in the upper right corner, $V_{DC}$ in the lower left corner, and $V_{DD}$ in the lower right corner. The normal compression and storage of this composite image may then be performed. A separate storage area in memory 70 may be assigned for the composite image. In addition, if desired, the original full size images may be stored in their own assigned storage areas. It will be understood that many such combinations may be made and are limited only by the controls made available to the operator of the system.

As with system 10, system 60 includes security system 40 to prevent unauthorized persons from accessing the system.

Although not shown in FIG. 5, system 60 includes a playback capability similar to that of system 10. Operation of the playback portion of the system is similar to that previously described. It will appreciated that, as with the playback portion of system 10, microprocessor 68 and memory 70 are remote from the locations where playback occurs. Again, the rates at which stored frames of video are obtained from memory 70 are different than the rates at which the video images are processed by microprocessor 68 and images are played back simultaneously with newly acquired images being processed and stored. Since the stored images are time and date stamped, the processor of the playback portion of the system can go directly to their storage location in the memory to retrieve the images.

Any images to be replayed are either reference images, which may be retrieved, decompressed, and displayed directly, or changed image blocks, which must be combined with a reference image to produce an image at the time requested. The combining of changed image blocks with the reference image blocks is performed by decompressing the reference image, decompressing the changed image blocks from the subsequent image, and then replacing the corresponding image blocks in the reference image with the changed image blocks from the subsequent image. In order to determine which blocks in the reference image must be replaced, an associated block map is stored for each group of changed image blocks which determines their location in the reference image. A preferred map is to keep a binary representation of all the blocks in the image such that a single bit in the memory map determines if each block is changed or unchanged. For example, a 0 in the map may indicate an unchanged block and a 1 a changed block. Thus, there are as many bits in the image map as there are blocks in each digital image. The image map bits may be stored in order to correspond to a position in the image. For example, starting at the upper left corner of the image and provide the first bit in the image map as corresponding to this location. Subsequent bits may then correspond in order to the blocks proceeding from the upper left corner to the upper right corner and then from the left side of the second row to the right side of the second row and so forth until the entire image is accounted for. For a 640 by 480 pixel image divided into blocks of 32 pixels by 32 pixels, this will result in 20 blocks across the image and 20 bits in the image map corresponding to the top row of blocks. There are then 15 rows of blocks and consequently a total of 20 times 15 or 300 bits required in the image map. The resulting image map so described may be stored directly or may be compressed to conserve storage space in memory.

As any individual image may be recreated by retrieving the changed macro blocks and the corresponding reference image, it is evident that this process facilitates all the normal replay functions such as forward play, reverse play, fast forward, fast reverse, pause, etc. In addition, using the transaction ID associated with corresponding images it is evident that a transaction ID may be found and the corresponding image displayed without having to replay any other images.

Finally, the stored images can be downloaded from the memory 70 to other storage media, such as tapes, CD-ROMs, or other magnetic media without loss in the quality of the image.

What has been described is a DVR system for recording financial transactions or other important occurrences. The system employs a video camera and an image processor having a memory capability. The system captures, processes and stores video images, and maintains the high resolution (quality) of the stored image regardless of how much times lapses before the image is viewed, and how often the image is viewed. Review of a stored image can be done while the system continues to acquire and process new images. The use of image compression greatly increases the memory storage capability of the system, and image compression ratios are not constant but vary as a function of the aspect of the object viewed and other factors. Recorded images are time and date stamped and authenticated for future usage. The system is expandable for use with multiple cameras and processors and with an expandable memory.

In view of the foregoing, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A digital video recording system comprising:
   a camera directed at a scene of interest to view the scene and to continuously generate a plurality of video images thereof, each of said video images comprising a plurality of pixel elements;
   an image processor configured to process blocks of said pixels and to compare each of said blocks against a corresponding block from a previously established reference image of said scene to determine if any changes have occurred therein, said processor configured to identify which of said blocks in said video images have changed relative to the corresponding block in said previously established reference image;

a memory associated with said image processor, said memory configured to store said reference image and said identified changed blocks in said memory; and said image processor is further configured to access said memory to retrieve said video images produced by said camera, said image processor accessing said memory at any desired memory location representing a time of interest so as not to have to sequentially scan a plurality of video images to locate a video image of interest, and said image processor configured to access said memory without interrupting said processing of currently acquired video images.

2. The system of claim 1 wherein said camera is an analog video camera.

3. The system of claim 2 further including a frame grabber configured to receive said video images from said camera and to generate a digital signal representation of said video images.

4. The system of claim 1 wherein said camera is a digital video camera.

5. The system of claim 1 wherein said image processor is configured to update said previously established reference image of the scene against which said digital signals are compared.

6. The system of claim 1 wherein said image processor is further configured to store a time and date stamp with said video images.

7. The system of claim 1 wherein said image processor is further configured to store authentication data with said video images.

8. The system of claim 1 wherein said image processor is configured to retrieve said video images at a second frame rate different from a first frame rate at which said video images were captured by said camera.

9. The system of claim 1 wherein said image processor is remote from said memory and said system includes a transmission means for communicating video images between said memory and said image processor.

10. The system of claim 1 further including an event identifier, said event identifier providing event identification data to said image processor, said image processor configured to associated said event identification data with said video images generated by said camera.

11. A digital video recording system comprising:
a camera directed at a scene of interest to view the scene and to continuously generate a plurality of video images thereof;

an image processor configured to compare the video images generated by said camera with a previously established reference image of said scene to determine if any changes have occurred therein;

a memory associated with said image processor, said memory configured to store a plurality of video images;

wherein said image processor is further configured to access said memory to retrieve said video images produced by said camera, said image processor accessing said memory at any desired memory location representing a time of interest so as not to have to sequentially scan a plurality of video images to locate a video image of interest, and said image processor configured to access said memory without interrupting said processing of currently acquired, video images;

wherein each of said plurality of video images comprises a plurality of pixel elements and said image processor is configured to process blocks of said pixels and to compare each of said blocks against a corresponding block from said previously established reference image;

wherein said image processor is configured to identify which of said blocks in said video images have changed relative to the corresponding block in said previously established reference image; and wherein said image processor is configured to store said reference image and said identified changed blocks in said memory.

12. The system of claim 11 wherein said image processor is configured to store the location in said image of said identified changed blocks in said memory.

13. The system of claim 11 wherein said image processor is configured to compress said reference image and said identified changed blocks prior to storage.

14. A digital video recording system comprising:
a camera directed at a scene of interest to view the scene and to continuously generate a plurality of video images thereof;

an image processor configured to compare the video images generated by said camera with a previously established reference image of said scene to determine if any changes have occurred therein;

a memory associated with said image processor, said memory configured to store a plurality of video images;

wherein said image processor is further configured to access said memory to retrieve said video images produced by said camera, said image processor accessing said memory at any desired memory location representing a time of interest so as not to have to sequentially scan a plurality of video images to locate a video image of interest and said image processor configured to access said memory without interrupting said processing of currently acquired video images;

wherein each of said plurality of video images comprises a plurality of pixel elements and said image processor is configured to process blocks of said pixels and to compare each of said blocks against a corresponding block from said previously established reference image; and wherein said image processor is configured to store those block of said video image which differ from a corresponding block of said reference image, said image processor configured to apply a compression algorithm to each of said blocks prior to storage to maximize the storage capability of said memory.

15. A digital video recording system comprising:
a plurality of cameras directed towards at least one scene of interest to view said at least one scene and to continuously generate a plurality of video images thereof;

an image processor configured to compare said plurality of video images generated by said cameras with a plurality of previously established reference images of said at least one scene to identify any regions of change therein, said processor configured to store only those regions of said video images which differ from said a corresponding region of the reference image and the reference image in a memory associated with said image processor; and wherein said image processor is further configured to access said memory to retrieve at least one video image of interest produced by said cameras, said image processor accessing said memory at any desired memory location representing a time of interest so as not to have to sequentially scan a plurality of video images to locate said video image of interest, and said image processor configured to access said memory without interrupting said processing of currently acquired video images.

16. The system of claim 15 wherein said image processor is further configured to access said memory to retrieve a plurality of video images of interest produced by said cameras.

17. The system of claim 15 wherein said image processor is configured to generate a combined video image from said plurality of video images generated by said cameras and to compare said combined video image with a combined reference image composed of a plurality of reference images of said at least one scene.

18. A digital video recording system comprising:
a plurality of cameras directed towards at least one scene of interest to view said at least one scene and to continuously generate a plurality of video images thereof;
an image processor configured to compare said plurality of video images generated by said cameras with a plurality of previously established reference images of said at least one scene to identify any regions of change therein;
a memory associated with said image processor, said memory configured to store a plurality of images;
wherein said image processor is further configured to access said memory to retrieve at least one video image of interest produced by said cameras, said image processor accessing said memory at any desired memory location representing a time of interest so as not to have to sequentially scan a plurality of video images to locate said video image of interest, and said image processor configured to access said memory without interrupting said processing of currently acquired video images; and
wherein said image processor is configured to store any identified regions of change in said memory.

19. A method of recording video images and storing and retrieving the same comprising:
viewing a scene of interest with a camera and generating video images thereof;
converting each frame of video imagery produced by said camera to a digital signal;
processing said digital signal, said processing including comparing blocks of the video image represented by a digital signal with corresponding blocks of a previously established reference of the scene to determine if any changes have occurred in any of the blocks therein, and storing the contents of said blocks in a memory if the block differs from the corresponding block of the reference image with date and time data appended to each stored video image represented by a digital signal; and,
accessing said memory to retrieve the contents of said digital signals to recreate the video images produced by said camera, said memory being accessed to retrieve said video images simultaneously with digital signals being stored therein, and said memory being accessed at any desired location representing a time of interest whereby video images stored in said memory do not to be sequentially scanned to locate a video image of interest.

20. The method of claim 19 wherein said video images are acquired from said camera at one frame rate and from said memory at a second predetermined frame rate.

21. The method of claim 19 further including accessing said memory from a location remote therefrom.

22. The method of claim 19 further including authenticating stored video images.

23. The method of claim 19 further including a plurality of cameras each of which is directed at a respective scene of interest, and the method further includes each camera continuously viewing each respective scene and generating video images thereof at a predetermined frame rate, converting each frame of video image from each camera to a signal, processing each digital signal and storing the processed video images in the memory.

24. The method of claim 19 wherein said image processor is configured to update the reference image against which said digital signals are compared.

25. A digital video recording system comprising:
a camera directed at a scene of interest to view the scene and to continuously generate a plurality of video images thereof;
an image processor configured to compare the video images generated by said camera with a previously established reference image of said scene to identify the occurrence of a change in said scene;
a memory associated with said image processor, said memory configured to store video image data of the video image if the video image differs from the reference image;
wherein said image processor is further configured to select and store said previously established reference video image in said memory, and wherein said image processor is further configured to store, in said memory, video image data representative of identified changes in said scene;
wherein each of said video images is composed of a plurality of pixels, and wherein said video image data representative of identified changes in said scene includes at least one changed block of pixels from a video image together with a reference image associated block map; and
wherein said reference image associated block map consists of at least one binary representation of a corresponding pixel block comprising a video image, a first binary representation indicating an unchanged pixel block, and a second binary representation indicating a changed pixel block.

26. The system of claim 25 wherein a position of said binary representation of said corresponding pixel block in said reference image associated block map indicates the position of said pixel block in said video image.

27. The system of claim 25 wherein said video image data representative of identified changes is compressed prior to storage in said memory.

28. The system of claim 25 wherein said video image data representative of identified changes includes transaction identification information.

29. The system of claim 25 wherein said image processor is further configured to reconstruct a video image of a changed scene by extracting said previously established reference video image together with said video image data representative of said identified changes in said scene from said memory.

* * * * *